(No Model.) 4 Sheets—Sheet 1.
S. A. BEMIS & L. PFINGST.
ELECTRIC AND CABLE RAILWAY CAR.

No. 410,871. Patented Sept. 10, 1889.

Witnesses:

Inventors,
Sumner A. Bemis,
and Louis Pfingst,
by
Attorneys.

(No Model.) 4 Sheets—Sheet 2.
S. A. BEMIS & L. PFINGST.
ELECTRIC AND CABLE RAILWAY CAR.
No. 410,871. Patented Sept. 10, 1889.
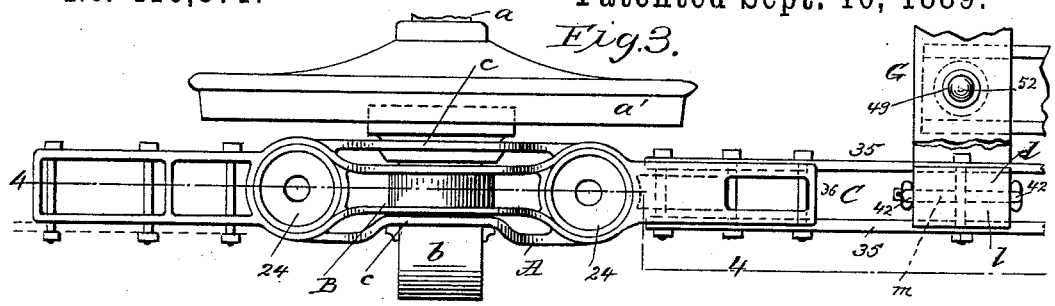
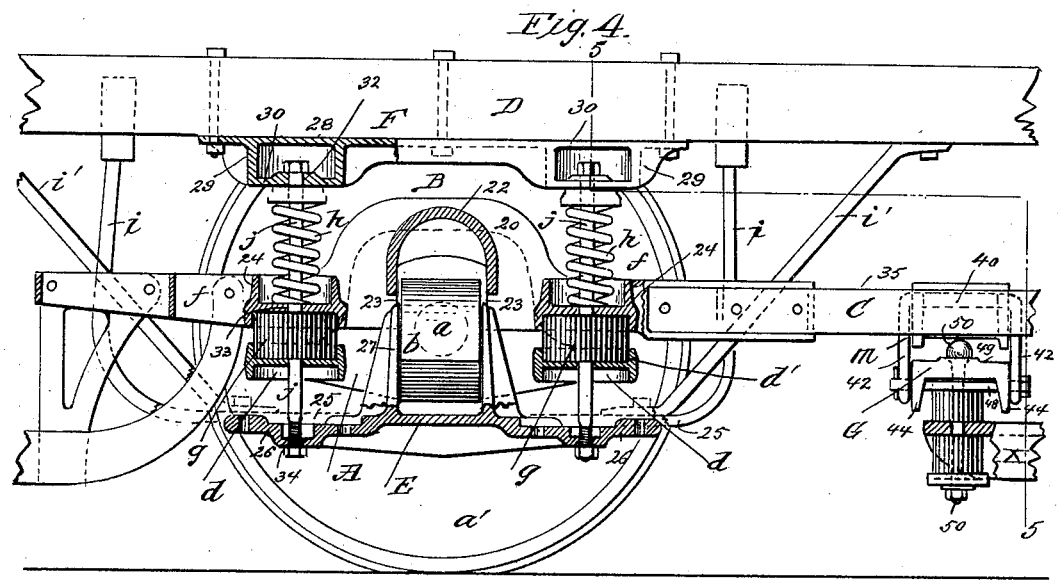
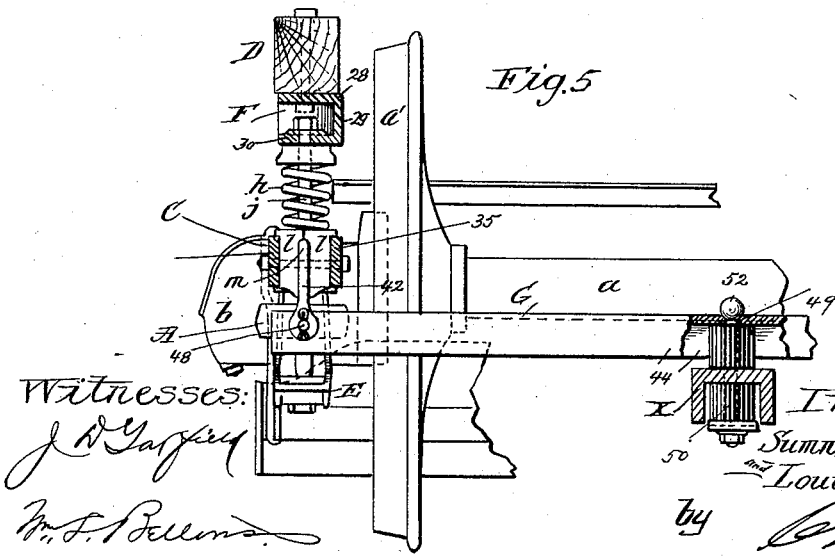

(No Model.) 4 Sheets—Sheet 3.
S. A. BEMIS & L. PFINGST.
ELECTRIC AND CABLE RAILWAY CAR.
No. 410,871. Patented Sept. 10, 1889.
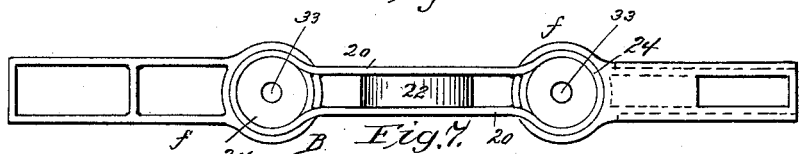
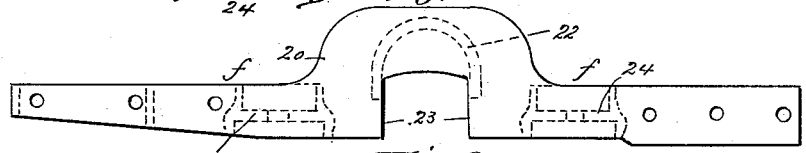
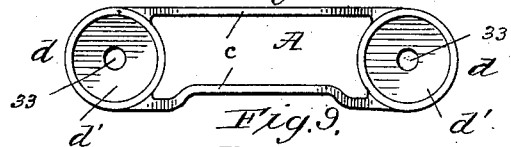
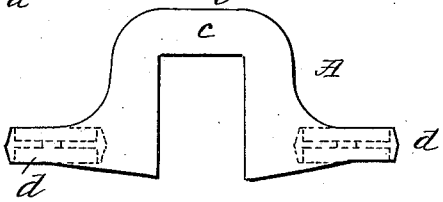
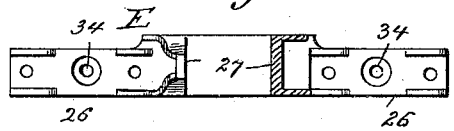
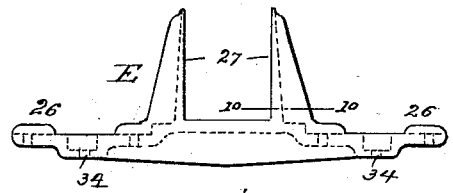
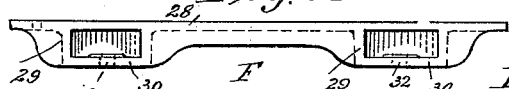
Witnesses:
J. D. Garfield
Wm. F. Bellows
Inventors
Sumner A. Bemis,
and Louis Pfingst,
by Chapin
Attorneys (No Model.)  S. A. BEMIS & L. PFINGST.  4 Sheets—Sheet 4.
ELECTRIC AND CABLE RAILWAY CAR.
No. 410,871. Patented Sept. 10, 1889.
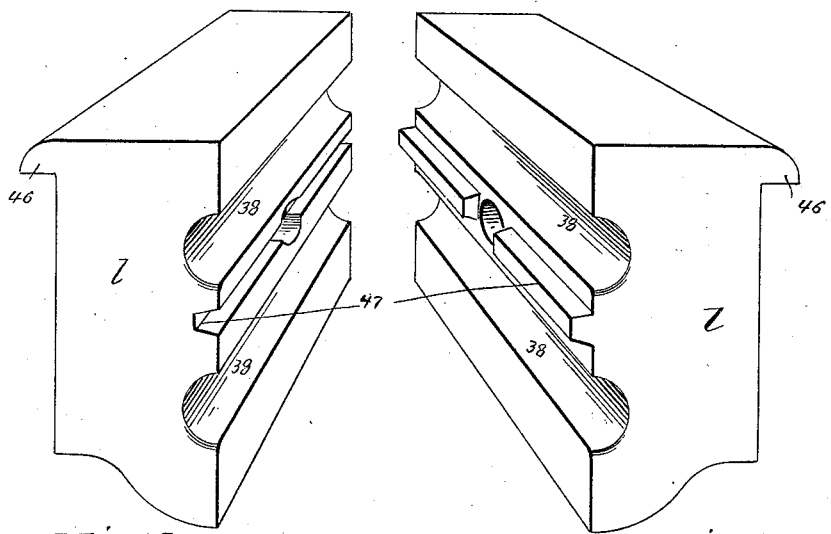
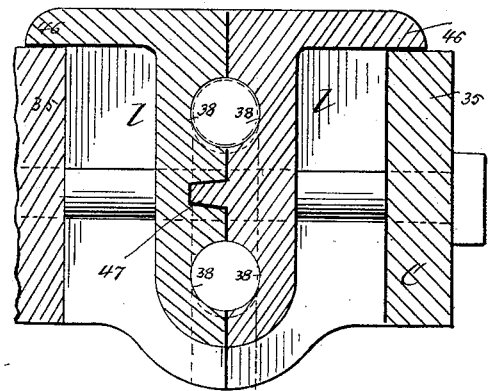
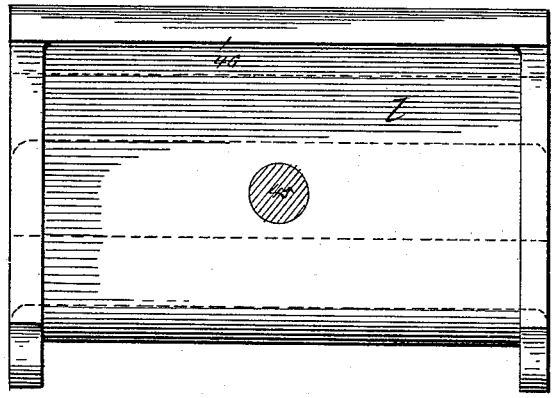
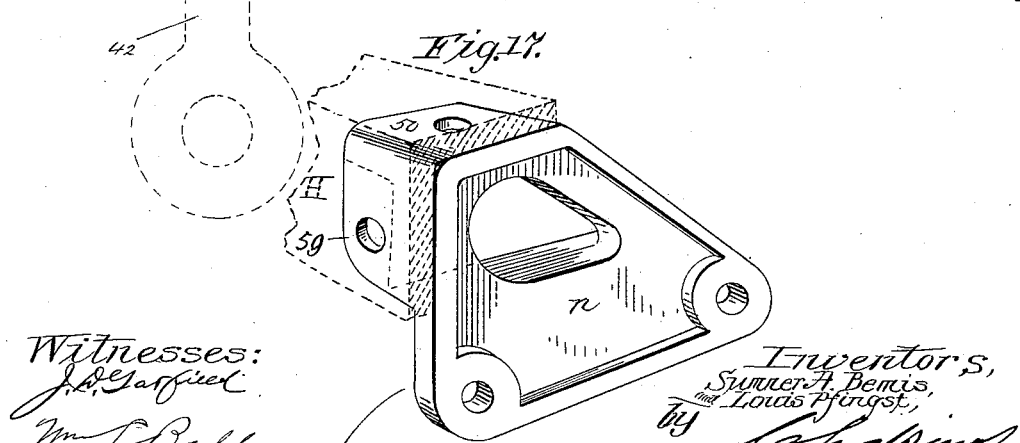
Witnesses:
Inventors,
Sumner A. Bemis,
Louis Pfingst,
by
Attorneys.

UNITED STATES PATENT OFFICE.

SUMNER A. BEMIS, OF SPRINGFIELD, AND LOUIS PFINGST, OF BOSTON, MASSACHUSETTS.

ELECTRIC AND CABLE RAILWAY CARS.

SPECIFICATION forming part of Letters Patent No. 410,871, dated September 10, 1889.

Application filed May 22, 1889. Serial No. 311,751. (No model.)

*To all whom it may concern:*

Be it known that we, SUMNER A. BEMIS, residing at Springfield, in the county of Hampden, and State of Massachusetts, and LOUIS PFINGST, residing at Boston, in the county of Suffolk, and State of Massachusetts, citizens of the United States, have invented new and useful Improvements in Electric and Cable Railway Cars, of which the following is a specification.

This invention relates to improvements in electric and cable cars, particularly relating to improved means for mounting and spring-supporting the car-body on the truck; to improvements in means for hanging the motor from the yoke-frame, whereby it may be advantageously supported for its most efficient operation; to an improved construction of the yoke-frame for the proper supporting of the brake independently of the springing or bounding motion of the car, and to an improved shoe and connection for the bracing or trussing parts between the truck and the sill of the car; and the invention consists in the constructions and combinations of parts, all substantially as will hereinafter more fully appear, and be set forth in the claims, reference being had to the accompanying drawings, in which corresponding parts in all the views are indicated by similar characters of reference.

Figure 1:
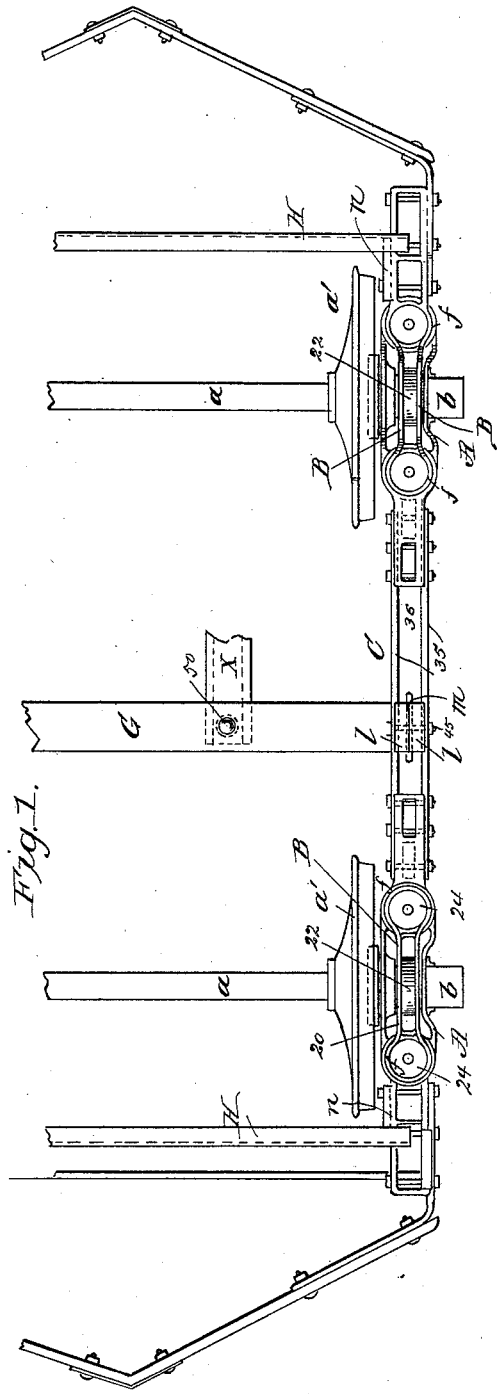
Figure 2:
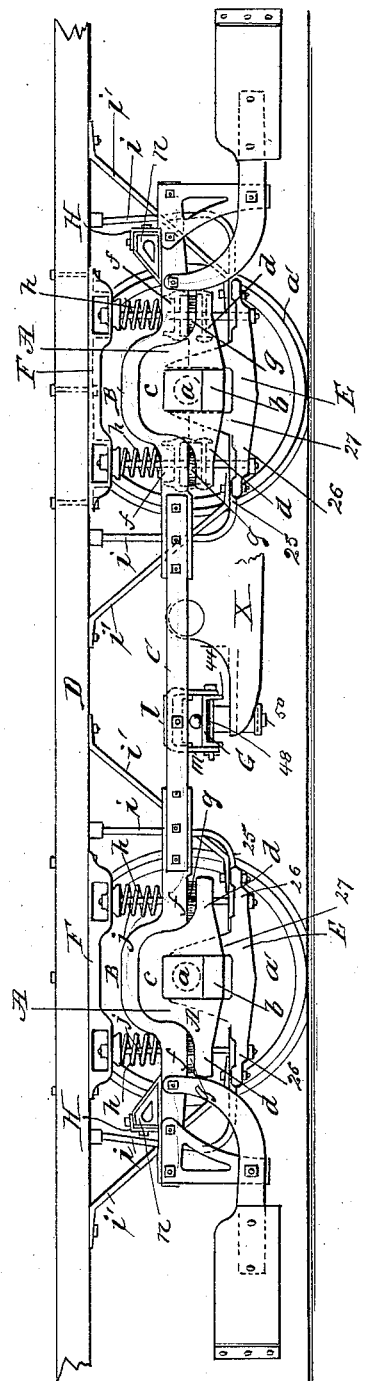

Figure 1 is a plan view of one side of the improved truck as seen below the sill of the car. Fig. 2 is a side elevation of the truck with the sill of the car supported thereon, a portion of an electric motor, also supported on the truck, being indicated at X. Fig. 3 is a view similar to Fig. 1—viz., a plan of one corner of the truck on an enlarged scale. Fig. 4 is a sectional elevation of a portion of the sill and of the parts shown in said preceding figure, the parts indicated by section-lines being on the cutting plane represented by the line 4 4, Fig. 3. Fig. 5 is an end elevation and cross-sectional view of the parts of the truck as seen looking from the middle of the truck, the parts shown in vertical cross-section being on the planes indicated by the lines 5 5, Fig. 4. Figs. 6 and 7 are respectively a plan and side view of one of the yokes comprised in the yoke-frame. Figs. 8 and 9 are respectively a plan and side view of a removable step that is provided on each journal-box of the truck. Figs. 10 and 11 are respectively a plan and side view of a part of the removable shoe and brace or truss connection. One of the risers in Fig. 10 is shown in horizontal section. Figs. 12 and 13 are respectively a plan and a side view of the improved sill-plate. Fig. 14 is a perspective view of the separate members of a block for supporting a clevis from which the motor-carrying beam is suspended. Fig. 15 is a cross-sectional view at said block, and Fig. 16 is a side view thereof. Fig. 17 is a detail view of a part employed in mounting and connecting the brake-carrying beam.

As in Patent No. 402,890, issued to us May 7, 1889, a yoke-frame is employed, said yoke-frame consisting of two pairs of yokes having arched intermediate portions and inner and outer extensions, longitudinal beams uniting said inner extensions of side pairs of the yokes, and the compound and beam-connected yokes for each side of the truck united by one or more cross-beams. Said yoke-frame comprises improvements in the details thereof, as will shortly hereinafter appear.

Referring to the drawings, *a* represents the axles for the car-wheels *a'*, carrying the journal-boxes *b* outside of the said wheels.

A represents a removable step, comprising an arched intermediate part *c* (to rest on the top and embrace the sides of the journal-box *b*) and the forward and rearward, or, as will be herein termed, the "inner" and "outer" horizontal step-extensions *d d*, each extension having a socket or seat *d* formed on its upper side for supporting the cushions *g*, which in turn support the inner and outer yoke-extensions *f* and *f*, which are carried at the forward and rearward portion of the yoke or arched portion B, that lies above and in this instance separated vertically from the top of the journal-box. Said yoke B is formed with opposing cheek or side plates 20 20, centrally united by an upwardly-arching cross-web 22, the lower portions of which, when the yoke is in place on the truck, extend below the plane of the top of the journal-box, so that the yoke is prevented from forward or rearward chucking, such movement being also more certainly prevented by the ends 23 of the yoke-extensions under the arched portion of the yoke bearing against the sides of the journal, and said side plates project forwardly and rearwardly in and constitute the yoke-extensions $f\ f$, already mentioned, being united by the horizontal circular and double cup-shaped webs 24 24, which form by their under portions sockets for said cushions $g\ g$ and by their upper portions sockets and seats for the rest thereon of the lower ends of the sill-supporting springs $h$. The said yoke-extensions $f\ f$ are also continued forwardly and rearwardly beyond said socketed portions, and are to be of any suitable ribbed and webbed construction for the utmost lightness consistent with the necessary strength. The yokes of each side pair thereof are connected by a longitudinal yoke-beam C, overlapping and firmly bolted to the inner yoke-extensions.

$i\ i$ represent a pair of hanger-braces located one to the forward and one to the rearward of of each journal and by their upper ends securely attached to the sill D of the car-body, extending vertically downwardly therefrom and terminating in angular and horizontal extremities 25, to which are connected the inner and outer end extensions 26 of the shoe and brace connection E, the same also comprising, intermediately of said inner and outer extensions, a pair of vertical risers 27 27, one in advance of the other, having a degree of separation between their walls corresponding to the width of the journal-box, and, as clearly shown in Fig. 4, said risers engage with said journal-box, and through such engagement and the brace-connection with the sill of the car-body any endwise shifting or chucking of the car-body is prevented. In addition to said hanger-braces $i\ i$ other braces $i'\ i'$ are provided, the same being obliquely disposed between said shoe and brace connection and the sill for a still further bracing and trussing action.

F represents the sill-plate, (shown as applied on the under side of the sill and above each journal,) said plate being also shown in detail in Figs. 12 and 13, and as consisting of the plate proper 28, having bolt-holes whereby it may be firmly bolted to the car, and pending therefrom, through any suitable bracket or web construction — such, for instance, as shown at 29 — is a supplemental horizontal and integrally-formed plate or shelf 30. The car-supporting springs $h\ h$ rest between the sockets on the yoke-extensions and the under side of said plates F, and the spring-bolts $j$ pass vertically through perforations 32, 33, and 34 in said plates 30, said yoke-webs $d'$, and the extensions 26 of said yoke and brace connections, respectively, and also through the rubber cushions $g$, each thereof at one end being headed and at its other receiving a nut. By providing the sill-plate having the depressed plates, whereby the engagement of the spring-bolts may be made as described, the necessity of forming large holes through the sill for the said spring-bolts, as heretofore, is avoided, and, furthermore, by unscrewing the nuts of the spring-bolts the car-body can be lifted clear of the running-gear.

G represents a transverse beam for supporting one end of the electric motor, said beam being extended between the yoke-beams C at each side of the truck, and by the means for suspension thereof, to be now described, the beam is capable of slight swinging or pitching motions longitudinally thereof and transversely of the car.

As will be seen in plan view, each yoke-beam C consists of dual side bars 35 35, with an opening 36 between said bars, and within said opening of each beam is secured a pair of separable clamping-blocks $l\ l$. Said blocks have, longitudinally thereof, opposing semicircular grooves 38 therein to match and receive the middle spindle-like portion 40 of a shackle-clevis $m$, which is comprised in a metal bar bent twice at right angles and thereby formed with two pending members 42, the extremities of which extend below the bottom of said double clamping-block and are formed into eyes. Said blocks are held in place between the side bars 35 of the yoke-beam C by a bolt 45, passed laterally through said side bars and said blocks, said parts being properly drilled therefor. Each block, as particularly shown in Figs. 14, 15, and 16, may have a flange 46 to lie over and upon the top edge of the adjacent side bar 35 of the yoke-beam, whereby it may be more firmly supported in its place. By forming an interlocking tongue and groove, as seen at 47, longitudinally in the meeting faces of said separable blocks they are the better held without the one shifting on the other to bind on the intermediate and clamped portion of the clevis to impede its free rolling movement. The transverse beam G at each edge is flanged, as at 44, (being in practice a "channel-iron,") and a bolt 48 passes in a direction longitudinally of the truck through the eyes in said paired pending members of each clevis and transversely through the flanges of said transverse beam. An intermediate portion of said horizontal transverse beam is vertically perforated, as at 49, Fig. 5, through which is passed a bolt or pin 50, having at its upper end a rounded head 52, by which it is prevented from falling through said beam, and whereby it is capable of slightly-radial swinging movements, and from the lower portion of said pin 50 is supported the one end of the motor, a part thereof in Figs. 1, 2, 3, 4, and 5 being indicated at X.

Instead of one set of matching semicircular grooves 38 in the separable blocks $l$, it is deemed preferable to provide two or more sets thereof at different heights, so that the clevis and motor-carrying beam may be suspended at varying heights, as will be plain.

As shown in Figs. 1, 2, and 17, on one of the side plates of each outer yoke-extension $f$, in a transverse line outside of the car-wheels, is bolted a bracket-plate $n$, having a laterally-projecting angular flange 59, and between each pair of laterally-opposing outer yoke-extensions of the truck is an angle-iron H, being firmly bolted or riveted to the said angular flanges of said bracket-plates. Said angle-iron, while laterally bracing and strengthening the yoke-frame, is of especial utility in affording a support for the brake mechanism directly on the truck, no connection thereof with the car-body being necessary, and hence any springing or shifting motion of said body on its trucks will not be imparted in any degree to the said brake mechanism to affect its most efficient operation.

It will be apparent from the construction of the truck hereinbefore described with reference to providing a support for an electric motor for the propulsion of the car that the same is, under said construction, adaptable for the support of grip appliances when the truck is comprised in a car to be run on cable railways.

What we claim as our invention is—

1. The combination, with the car-body and the journal-boxes for the car-wheel axles, of braces secured to and pending from said car-body, and the shoe and brace connections E E below the journal-boxes, comprising risers engaging said boxes and extensions to which said braces are connected, step-extensions $d$ for said journal-boxes, beam-connected yokes B B, having extensions $ff$, cushions between said step and yoke extensions, and springs between and supporting the car-body from the said yokes, substantially as described.

2. The combination, with the sill of a car-body, of a sill-plate comprising a main plate 28, adapted to be secured to the sill, and one or more supplemental plates 30, supported from and below said main plate and adapted to receive the connection therewith of the upper ends of the spring-bolts, substantially as described.

3. The combination, with the journal-boxes for the car-wheel axles, the sill of the car-body, and sill-plates, each comprising a main plate 28, adapted to be secured to the sill, and the supplemental perforated plates 30, supported from and below said main plate, of the braces secured to and pending from the car-body, and shoe and brace connections E, having risers 27, engaging the journal-boxes, and the extensions 26, to which said braces are connected, and having the perforations 34, the steps $d\ d$, supported from the journal-boxes, having the perforations 33, the beam-connected yokes B B, comprising the extensions $ff$, having the perforated webs 24, cushions $g$ between and supporting said yoke-extensions from said steps $d$, springs between and supporting said car-sills from said yoke-extensions, and the spring-bolts $j$ between and connected to said supplemental portions 32 of the sill-plates and said brace-connections, passing through the perforations of said yoke-webs and step and through the said cushions $g$ and springs $h$, substantially as described.

4. In a truck, the combination, with a longitudinal beam, as the yoke-beam C, of separable blocks having grooves 38 therein, the clevis $m$, and means for confining the said blocks together upon said beam and to embrace the middle portion of said clevis.

5. In a truck, the combination, with the beam comprising double bars 35 35, of the separable blocks $l\ l$, having the grooves 38 and flanges 46, the clevis $m$, and the bolt 45, passing through said double-barred beam and said blocks, substantially as and for the purpose described.

6. In a truck, the combination, with a beam C, of the separable blocks $l\ l$, having the grooves 38 and matching tongue and groove 47, the clevis $m$, and means for confining the said blocks together and upon the said beam, substantially as and for the purpose described.

7. The combination, with the outer extension of a yoke B, of a bracket-plate $n$, provided with the laterally-extending angular flange 59, formed to fit and be connected with one end portion of a brake-supporting angle-iron, substantially as described.

SUMNER A. BEMIS.
LOUIS PFINGST.

Witnesses to S. A. Bemis:
H. A. CHAPIN,
WM. S. BELLOWS.
Witnesses to L. Pfingst:
GEO. M. HOADLEY,
O. M. SHAW.